US012030015B2

(12) United States Patent
Vaughn et al.

(10) Patent No.: US 12,030,015 B2
(45) Date of Patent: Jul. 9, 2024

(54) CROSSLINKED POLYMER MEMBRANES AND METHODS OF THEIR PRODUCTION (71) Applicant: Saudi Arabian Oil Company, Dhahran (SA)

(72) Inventors: Justin Tyler Vaughn, Medford, MA (US); Benjamin James Sundell, Arlington, MA (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 633 days.

(21) Appl. No.: 17/180,399

(22) Filed: Feb. 19, 2021

(65) Prior Publication Data
US 2021/0170345 A1 Jun. 10, 2021

Related U.S. Application Data (62) Division of application No. 15/970,169, filed on May 3, 2018, now Pat. No. 10,960,361.
(Continued)

(51) Int. Cl.
B01D 53/22 (2006.01)
B01D 67/00 (2006.01)
(Continued)

(52) U.S. Cl.
CPC ....... B01D 53/228 (2013.01); B01D 67/0009 (2013.01); B01D 67/0011 (2013.01);
(Continued)

(58) Field of Classification Search
CPC ...... B01D 69/14; B01D 69/148; B01D 71/16; B01D 71/78; B01D 53/228;
(Continued)

(56) References Cited

U.S. PATENT DOCUMENTS 5,181,940 A 1/1993 Bikson et al.
10,960,361 B2 3/2021 Vaughn et al.
(Continued)

FOREIGN PATENT DOCUMENTS

GB 2376074 A 12/2002
JP 2003-82118 A 3/2003
(Continued)

OTHER PUBLICATIONS

Abdelmouleh, M. et al., Interaction of Silane Coupling Agents with Cellulose, Langmuir, 18: 3203-3208 (2002).
(Continued)

Primary Examiner — John Kim
(74) Attorney, Agent, or Firm — Osha Bergman Watanabe & Burton LLP (57) ABSTRACT Described in the present application are methods of producing silane-crosslinked polymer membranes at moderate temperatures using acid catalysts that, in certain embodiments, result in membranes with unexpectedly high permeabilities and selectivities. In certain embodiments, grafting and crosslinking of the silanes occur by immersing a preformed membrane in a solution comprising a silane and an acid catalyst. Alternatively, in certain embodiments, grafting of silanes to a polymer occurs in the presence of acid catalyst in solution and subsequent casting and drying produces crosslinked membranes. In certain embodiments, an acid catalyst is a weak acid catalyst. Also described in the present application are asymmetric crosslinked polymer membranes with porous layers. In certain embodiments, crosslinked cellulose acetate membranes have permeability up to an order of magnitude greater than the permeability of unmodified cellulose acetate membranes. The membranes have porous layers with a high porosity due to their processing in moderate conditions.

11 Claims, 8 Drawing Sheets

Related U.S. Application Data (60) Provisional application No. 62/501,363, filed on May 4, 2017.

(51) Int. Cl.
<table>
<tr><td>B01D 69/08</td><td>(2006.01)</td></tr>
<tr><td>B01D 69/12</td><td>(2006.01)</td></tr>
<tr><td>B01D 69/14</td><td>(2006.01)</td></tr>
<tr><td>B01D 71/16</td><td>(2006.01)</td></tr>
<tr><td>B01D 71/78</td><td>(2006.01)</td></tr>
<tr><td>C08K 5/5419</td><td>(2006.01)</td></tr>
<tr><td>C08L 1/12</td><td>(2006.01)</td></tr>
<tr><td>B01D 53/52</td><td>(2006.01)</td></tr>
</table>

(52) U.S. Cl.
CPC ....... *B01D 67/0013* (2013.01); *B01D 67/002* (2013.01); *B01D 67/006* (2013.01); *B01D 67/0093* (2013.01); *B01D 69/08* (2013.01); *B01D 69/12* (2013.01); *B01D 69/14* (2013.01); *B01D 69/148* (2013.01); *B01D 71/16* (2013.01); *B01D 71/78* (2013.01); *C08K 5/5419* (2013.01); *C08L 1/12* (2013.01); *B01D 53/52* (2013.01); *B01D 2257/304* (2013.01); *B01D 2257/50* (2013.01); *B01D 2323/22* (2013.01); *B01D 2323/30* (2013.01); *B01D 2323/38* (2013.01); *B01D 2323/46* (2013.01); *B01D 2325/02* (2013.01); *B01D 2325/20* (2013.01); *B01D 2325/24* (2013.01); *C08L 2203/16* (2013.01)

(58) Field of Classification Search
CPC ............ B01D 67/0006; B01D 67/0009; B01D 67/0011; B01D 67/0013; B01D 67/002; B01D 67/006; B01D 67/0093; B01D 53/52; B01D 2257/304; B01D 2257/50; B01D 2323/22; B01D 2323/30; B01D 2323/38; B01D 2323/46; B01D 2325/02; B01D 2325/20; B01D 2325/24; B01D 69/08; B01D 69/12; C08K 5/5419; C08L 1/12; C08L 2203/16; Y02C 20/40
See application file for complete search history.

(56) References Cited

U.S. PATENT DOCUMENTS

<table>
<tr><td>2010/0270234 A1</td><td>10/2010</td><td>Liu et al.</td></tr>
<tr><td>2010/0326273 A1</td><td>12/2010</td><td>Liu et al.</td></tr>
<tr><td>2015/0094445 A1</td><td>4/2015</td><td>Bhuwania et al.</td></tr>
<tr><td>2018/0318774 A1</td><td>11/2018</td><td>Vaughn et al.</td></tr>
</table>

FOREIGN PATENT DOCUMENTS

<table>
<tr><td>WO</td><td>WO-2009/148733 A2</td><td>12/2009</td></tr>
<tr><td>WO</td><td>WO-2016/136294 A1</td><td>9/2016</td></tr>
<tr><td>WO</td><td>WO-2018/204580 A1</td><td>11/2018</td></tr>
</table>

OTHER PUBLICATIONS

Achoundong, C. S. K. et al., Silane Modification of Cellulose Acetate Dense Films as Materials for Acid Gas Removal. Macromolecules (Washington, DC, U. S.), 46: 5584 (2013).
Achoundong, C. S. K., Engineering Economical Membrane Materials for Aggressive Sour Gas Separations, A Dissertation Presented to the Academic Faculty, Georgia Institute of Technology, 280 pages (Dec. 2013).
Arthanareeswaran, G. et al., Studies on Performance of Cellulose Acetate and Poly(Ethelene Glycol) Blend Ultrafiltration Membranes Using Mixture Design Concept of Design of Experiments. International Journal of Polymeric Materials and Polymeric Biomaterials, 55: 1133-1154 (2006).
Baker, R. W. and Lokhandwala, K. Natural Gas Processing with Membranes: An Overview. Ind. Eng. Chem. Res., 47: 2109-2121 (2008).
Baker, R. W. and Low, B. T. Gas Separation Membrane Materials: A Perspective. Macromolecules, 47: 6999-7013 (2014).
Baker, R. W. Future Directions of Membrane Gas Separation Technology, Ind. Eng. Chem. Res., 41: 1393-1411 (2002).
Brochier Salon, M.-C. et al., Kinetics of hydrolysis and self condensation reactions of silanes by NMR spectroscopy. Colloids and Surfaces A: Physicochemical and Engineering Aspects, 312: 83-91 (2008).
Dante, R. C et al., Fractional factorial design of experiments for PEM fuel cell performances improvement. International Journal of Hydrogen Energy, 28: 343-348 (2003).
Geise, G. M. et al., Water permeability and water/salt selectivity tradeoff in polymers for desalination, Journal of Membrane Science, 369: 130-138 (2011).
Guerra Nista, S. V. et al., Nanostructured membranes based on cellulose acetate obtained by electrospinning, part 1: Study of the best solvents and conditions by design of experiments. Journal of Applied Polymer Science, 126: E70-E78 (2012).
International Search Report for PCT/US2018/030793, 5 pages (dated Sep. 3, 2018).
Kobašlija, M. and McQuade, D. T. Polyurea Microcapsules from Oil-in-Oil Emulsions via Interfacial Polymerization, Macromolecules, 39: 6371-6375 (2006).
Kunst, B. and Sourirajan, S., Development of cellulose acetate ultrafiltration membranes. J. Appl. Polym. Sci., 18: 3423-2334 (1974).
Landaburu-Aguirre, J. et al., The removal of zinc from synthetic wastewaters by micellar-enhanced ultrafiltration: statistical design of experiments, Desalination, 240: 262-269 (2009).
Lonsdale, H. K. et al., Transport Properties of Cellulose Acetate Osmotic Membranes. Journal of Applied Polymer Science, 9, 1341 (1965).
Morita, R. et al., Synthesis, characterization, and gas permeation properties of the silyl derivatives of cellulose acetate. J. Membr. Sci., 305: 136-145 (2007).
Rivera-Armenta, J. L. et al., New polyurethane foams modified with cellulose derivatives. European Polymer Journal, 40: 2803-2812 (2004).
Robeson, L. M., Correlation of separation factor versus permeability for polymeric membranes. Journal of Membrane Science, 62: 165-185 (1991).
Robeson, L. M., The upper bound revisited, Journal of Membrane Science, 320: 390-400 (2008).
Shojaie, S. S. et al., Preparation and characterization of cellulose acetate organic/inorganic hybrid films. Journal of Applied Polymer Science, 58(8): 1263-1274 (1995).
Weissman, S. A. and Anderson, N. G. Design of Experiments (DoE) and Process Optimization. A Review of Recent Publications. Organic Process Research & Development, 19: 1605-1633 (2015).
Wen, J. and Wilkes, G. L. Organic/Inorganic Hybrid Network Materials by the Sol-Gel Approach. Chemistry of Materials, 8: 1667-1681 (1996).
Written Opinion for PCT/US2018/030793, 10 pages (dated Sep. 3, 2018).
Yasuda, H. et al., Permeability of solutes through hydrated polymer membranes. I. Diffusion of sodium chloride. Makromol. Chem., 118, 19-35 (1968).
Yu, W.-L. et al., Parametric analysis of the proton exchange membrane fuel cell performance using design of experiments. International Journal of Hydrogen Energy, 33: 2311-2322 (2008).
Zheng, X. et al., TBAF-catalyzed deacylation of cellulose esters: Reaction scope and influence of reaction parameters. Carbohydrate Polymers, 692-698, 98 (2013).

CROSSLINKED POLYMER MEMBRANES AND METHODS OF THEIR PRODUCTION

PRIORITY APPLICATIONS

This application is a division of U.S. patent application Ser. No. 15/970,169, filed May 3, 2018, entitled Crosslinked Polymer Membranes and Methods of Their Production, which claims the benefit of U.S. Provisional Patent Application No. 62/501,363, filed on May 4, 2017, entitled Crosslinked Polymer Membranes and Methods of Their Production, the disclosure of each of which is hereby incorporated by reference herein in its entirety.

TECHNICAL FIELD

The present application relates generally to polymer membranes for gas separation and methods of their production.

BACKGROUND

Polymer membranes are commonly used for gas sweetening to separate carbon dioxide and hydrogen sulfide out from natural gases. Cellulose acetate is currently the most commonly used membrane material in industrial gas separation applications. Typical membranes for industrial applications have asymmetric hollow fiber or thin film composite morphologies. Such morphologies are used for their large surface area to volume ratios that allow for high throughput. However, acid and sour gas permeability through industrial membranes, specifically cellulose acetate membranes, is lower than desired and membrane separation performance becomes significantly deteriorated when exposed to high concentrations of such gases. Thus, current membranes experience significant reduction in performance over their operational lifetimes.

SUMMARY

There is a need for polymer membranes with high permeability, selectivity, and plasticization resistance for use in industrial gas separation applications as well as for scalable methods of their production.

Crosslinking membranes with alkoxysilanes at temperatures significantly above the glass transition temperature of the membrane improves permeability in resulting membranes. However, processes that utilize temperatures above the glass transition temperature of the constituent polymers of a membrane are unsuitable for use with asymmetric morphologies, such as hollow fibers. Porous networks in the support layer of an asymmetric membrane morphology will densify or collapse when constituent polymers are above their glass transition temperature due to polymer flow. Pore densification reduces gas permeation. Additionally, high temperature crosslinking solution-phase reactions can swell the thin selective layer of asymmetric morphologies, causing non-selective and other non-ideal defects to be introduced into the membrane.

Described in the present application are methods of producing silane-crosslinked polymer membranes at moderate temperatures using acid catalysts that, in certain embodiments, result in membranes with unexpectedly high permeabilities and selectivities. Moderate temperatures are elevated temperatures less than a glass transition temperature of the membrane. In certain embodiments, alkoxysilanes are used to crosslink membranes. In certain embodiments, grafting and crosslinking of the silanes occur simultaneously by immersing a preformed membrane in a solution comprising a silane and an acid catalyst at an elevated temperature less than a glass transition temperature of the membrane. Alternatively, in certain embodiments, grafting of silanes to a polymer occurs in the presence of acid catalyst in solution and subsequent casting and drying processes (for example, at elevated temperature) result in the formation of crosslinked membranes. In certain embodiments, an acid catalyst is a weak acid catalyst. Such "multistep" methods do not require soaking a membrane in a high temperature crosslinking solution, which can swell and disrupt bulk membrane morphology.

Also described in the present application are asymmetric crosslinked polymer membranes with a highly porous layer. In certain embodiments, membranes made from cellulose acetate have permeability up to an order of magnitude greater than the permeability of unmodified cellulose acetate membranes. The polymer membranes have porous layers with a high porosity due to their processing in moderate conditions, which preserves initial pore morphologies. Polymer membranes in accordance with the present application include flat sheet, hollow fiber and thin film composite morphologies.

In accordance with the methods described in the present application, membranes with greatly enhanced properties, as compared to unmodified cellulose acetate, can be produced. Unmodified cellulose acetate is used as a baseline comparator due to its common use as an industrial membrane material. In certain embodiments, membranes are produced with $CO_2$ permeability of 20-60 Barrer when measured in pure gas flow at 25 degrees Celsius (° C.) and 100 pounds per square inch absolute (psia). In certain embodiments, such membranes have a permeability of at least 5 times the permeability measured for unmodified cellulose acetate at those conditions. In certain embodiments, permeability in membranes of the present application is 5-10 times that of unmodified cellulose acetate. In certain embodiments, membranes have $CO_2/CH_4$ selectivities of at least 20 as determined from measurements in pure gas flow at 25° C. and 100 psia. Plasticization resistance may be inferred from the increase in $CO_2$ permeability with increase in pressure. In certain embodiments, membranes have a $CO_2$ permeability measured in pure gas flow at 25° C. and 500 psia that is no more than 1.2 times $CO_2$ permeability measured in pure gas flow at 25° C. and 25 psia.

In some aspects, the present disclosure is directed to a method for forming a crosslinked polymer membrane, the method comprising: reacting, in solution, a silane (for example, an alkoxysilane (for example, vinyltrimethoxysilane or vinyl methly(dimethoxy)silane) or a silanol (for example, silanediol) or a mixture of an alkoxysilane and a silanol) with a polymer comprising a pendant nucleophile (for example, cellulose acetate) in the presence of a weak acid catalyst (for example, a carboxylic acid such as acetic acid), thereby grafting the cellulose acetate with at least a portion of the silane; casting an amount of the solution; and heating at least a portion of the cast solution to an elevated temperature (for example, between 40° C. and 80° C.) for a crosslinking period, thereby forming a polymer membrane comprising crosslinks formed from the silane.

In certain embodiments, the step of reacting comprises maintaining the solution at a temperature of at least 100° C. (for example, between 120° C. and 150° C. (for example, 130° C.)) for a grafting period of at least 5 minutes (for example, 2 hours or 3 hours).

In certain embodiments, the casting step comprises: immersing the amount of the solution in a nonsolvent. In certain embodiments, the casting step comprises: spinning (for example, wet spinning, dry spinning) the amount of the solution into a hollow fiber.

In certain embodiments, the crosslinking period is at least 10 minutes. In certain embodiments, the crosslinking period is up to 18 hours.

In certain embodiments, the solution comprises a solvent (for example, DMSO, DMAc, NMP, sulfolone, THF, or a mixture of them). In certain embodiments, a ratio of the silane to the solvent is between 5 percent (v:v) and 15 percent (v:v) (for example, 10 percent (v:v)). In certain embodiments, a ratio of the polymer to the solvent is between 1 percent (w:v) and 30 percent (w:v) (for example, 5 percent (w:v)).

In certain embodiments, the method further comprises: mixing the silane and the solvent, wherein the silane is a dry silane and the solvent is dry solvent; mixing the weak acid catalyst with the mixture of the silane and the solvent, wherein the weak acid catalyst is a dry weak acid catalyst; and mixing the polymer (for example, cellulose acetate) with the mixture of the weak acid catalyst, silane, and solvent while stirring, wherein the polymer is a dry polymer.

In some aspects, the present disclosure is directed to a method for modifying a preformed polymer membrane, the method comprising: immersing a preformed polymer membrane in a solution comprising a weak acid catalyst (for example, a carboxylic acid (for example, acetic acid)) and a silane (for example, an alkoxysilane (for example, vinyltrimethoxysilane or vinyl methly(dimethoxy)silane) or a silanol (for example, silanediol) or a mixture of an alkoxysilane and a silanol), wherein the preformed polymer membrane comprises a polymer repeat unit comprising a pendant nucleophile (for example, cellulose acetate); and maintaining the solution, wherein the membrane is immersed, at a crosslinking temperature of at least 100° C. (for example, between 100° C. and 130° C.) but less than the glass transition temperature of the membrane for a crosslinking period, thereby crosslinking the membrane with at least a portion of the silane.

In certain embodiments, the crosslinking period is at least 5 minutes (for example, up to 5 hours (for example, up to 3 hours)).

In certain embodiments, the method further comprises: removing the membrane from the solution; and drying the membrane at a drying temperature of at least 100° C. (for example, between 110° C. and 130° C.).

In certain embodiments, the method further comprises: solvent exchanging the membrane with a non-solvent (for example, methanol, hexane, or a mixture of methanol and hexane) after removing the membrane from the solution prior to the drying step.

In certain embodiments, a weight ratio of the silane to the weak acid catalyst in the solution is at least 5:1 (for example, at least 9:1). In certain embodiments, a molar ratio of the silane to the polymer in the solution is at least 1:1 (for example, at least 40:1 or at least 100:1).

In some aspects, the present disclosure is directed to an asymmetric crosslinked polymer membrane, comprising: a porous support layer; and a dense selective layer comprising a polymer comprising a pendant nucleophile and a plurality of crosslinks comprising silanes (for example, reacted alkoxysilanes (for example, vinyltrimethoxysilane or vinyl methly(dimethoxy)silane) or reacted silanols (for example, silanediol)), wherein a $CO_2$ permeability through the membrane is at least 25 Barrer (for example, at least 50 Barrer (for example, between 25 Barrer and 60 Barrer)) when measured in pure gas flow at 25° C. and 100 psia (for example, and the porous polymer support layer and the dense selective layer comprise cellulose acetate).

In certain embodiments, the membrane comprises a polymer comprising a member selected from the group consisting of a polyimide, a polysulfone, a polyamide, a polybenzoxazole, a polybenzimidazole, a polyphenyl ether, a polyketone, a polynorbornen, and an ester of cellulose. In certain embodiments, the membrane comprises cellulose acetate.

In certain embodiments, a $CO_2/CH_4$ selectivity across the membrane is at least 20 (for example, at least 22, at least 25, at least 27, at least 30) as determined from measurements in pure gas flow at 25° C. and 100 psia. In certain embodiments, $CO_2$ permeability measured in pure gas flow at 25° C. and 500 psia is no more than 2.5 times (for example, 1.2 times) $CO_2$ permeability measured in pure gas flow at 25° C. and 25 psia.

In certain embodiments, at least a portion of the plurality of crosslinks are oligomeric. In certain embodiments, an average of crosslink lengths is between 3 and 6 units in length. In certain embodiments, the membrane comprises crosslinks formed from vinyltrimethoxysilane.

In certain embodiments, the porous support layer and the dense selective layer form a continuous asymmetric structure (for example, wherein the porous support layer and the dense selective layer are joined by a plurality of entanglements). In certain embodiments, the asymmetric crosslinked membrane is a hollow fiber or thin film. In certain embodiments, the asymmetric crosslinked membrane is a thin film composite membrane.

Definitions

In order for the present application to be more readily understood, certain terms used in the present application are defined as follows. Additional definitions for the following terms and other terms may be set forth throughout the specification.

As used in this application, the term "wt. %" refers to a weight percent. The terms "(v:v)", "(w:w)", and "(w:v)" refer to a ratio of a volume to a volume, a weight to a weight, and a weight to a volume, respectively. Ratios may be listed as percentages. For example, 10% (w:v) means that for every 100 milliliters (mL) of solution, there is 10 grams (g) of solute.

As used in this application, the term "comprise" and variations of the term, such as "comprising" and "comprises," are not intended to exclude other additives, components, integers or steps. In this application, where ranges are provided, endpoints are included. In this application, the term "a" may be understood to mean "at least one," unless otherwise clear from context.

Glass transition temperature: As used in this application, the term "glass transition temperature" has its art-understood meaning. "Glass transition temperature" refers to a temperature or range of temperatures at or in which a polymer transitions between a glassy state and rubber-like state in which the polymer can flow. In certain embodiments, a temperature less than a glass transition temperature is a temperature less than the minimum temperature of a range. In certain embodiments, a temperature less than a glass transition temperature is a temperature less than the maximum temperature of a range. In certain embodiments, a glass transition temperature for a membrane is taken to be a minimum temperature of a plurality of glass transition temperatures for different polymers in a membrane. In certain embodiments, a temperature less than a glass transition temperature is a temperature at most equivalent to the glass transition temperature.

Elevated temperature: As used in this application, an "elevated temperature" is a temperature above room temperature. Room temperature is taken to be 25° C.

Polymer membrane: As used in this application, the term "polymer membrane" refers to a membrane with a dense selective layer comprising a polymer with at least one pendant nucleophile. A polymer membrane may comprise other layers. A polymer membrane may be of any morphology known in the art.

Pure gas: As used in this application, "pure gas" refers to a gas essentially free of other gases. In certain embodiments, a pure gas is at least 95% pure. For example, a pure gas may be at least 99% or at least 99.9% pure.

Features and advantages of the present application will become more apparent to one of ordinary skill in the art from the following detailed description when taken in conjunction with the drawing, in which like reference characters identify corresponding elements throughout. In the drawing, like reference numbers generally indicate identical, functionally similar, structurally similar, or functionally and structurally similar elements.

DETAILED DESCRIPTION

It is contemplated that methods and processes of the present application encompass variations and adaptations developed using information from the embodiments described in the following description. Adaptation and/or modification of the membranes, methods, and processes described in the following description may be performed by those of ordinary skill in the relevant art.

Throughout the description, where membranes are described as having, including, or comprising specific components, or where processes and methods are described as having, including, or comprising specific steps, it is contemplated that, additionally, there are membranes of the present application that consist essentially of, or consist of, the recited components, and that there are processes and methods according to the present application that consist essentially of, or consist of, the recited steps.

It should be understood that the order of steps or order for performing certain action is immaterial so long as the method or process remains operable. Moreover, two or more steps or actions may be conducted simultaneously.

The mention in the present application of any publication, for example, in the Background section, is not an admission that the publication serves as prior art with respect to any of the presented claims. The Background section is presented for purposes of clarity and is not meant as a description of prior art with respect to any claim. Headers are provided for the convenience of the reader and are not intended to be limiting with respect to the claimed subject matter.

Embodiments of the present application include methods to produce silane-crosslinked polymer membranes using acid catalysts. In certain embodiments, methods comprise immersing preformed polymer membranes in solutions of silanes and acid catalysts in order to simultaneously graft and crosslink the membrane. In certain embodiments, methods comprise grafting polymers with silanes in the presence of acid catalysts, forming a membrane from the grafted polymer, crosslinking the membrane, and drying the membrane. A range of materials may be used in accordance with these methods to produce crosslinked polymer membranes.

Membrane and Reagent Materials

Disclosed membranes generally comprise a polymer membrane material with silane crosslinks. Disclosed methods for forming such membranes use reaction solutions generally comprising a polymer, a silane, and a weak acid catalyst. In certain embodiments, reaction solutions additionally comprise a solvent. The following is a non-exhaustive list of suitable materials and reagents for use in the membranes and methods of membrane production of the present application.

Polymers for Membranes

The present application includes crosslinked polymer membranes and methods of producing crosslinked membranes. A membrane may include one or more polymer constituents. A polymer constituent may be a part of a preformed membrane or may be used in the production of a membrane.

Polymers suitable for use in accordance with products and methods of the present application are polymers with a pendant nucleophile that can react with a silane to form a chemical bond between the silane and the polymer chain, thus allowing the silane (for example, an alkoxysilane) to chemically crosslink two or more polymer chains together. Such polymers may be, for example, polyamides, polybenzoxazoles, polybenzimidazoles, polyphenylene oxide, polyphenylene sulfide, polyketones, polytrimethylsilylpropyne, polynorbornenes, polyimides, polysulfones, or cellulose-based polymers (for example, esters of cellulose). In certain embodiments, a membrane comprises a polyimide comprising a diamine. For example, the diamine may be 3,3'-dihydroxy-4,4'-diamino-biphenyl (HAB) or 2,2-bis(3-amino-4-hydroxyphenyl)-hexafluoropropane (bisAPAF). In certain embodiments, the pendant nucleophile is a hydroxyl group. In certain embodiments, polymer membranes are cellulose acetate (CA) membranes. In certain embodiments, a polymer comprising a pendant nucleophile is cellulose acetate. In certain embodiments, a polymer repeat unit comprising a pendant nucleophile is cellulose acetate.

Generally, any molecular weight or dispersity of polymer chains may be used to form a membrane. Use of polymers with molecular weight equal to or greater than the entanglement molecular weight ($M_e$) of the polymer in a membrane imparts greater mechanical stability to the polymer membrane than use of polymers with molecular weights less than $M_e$ of the polymer, for example, due to the presence of physical entanglements. In certain embodiments, very high molecular weight polymer chains may reduce solution processability during membrane production. Very high molecular weight may be a molecular weight at or exceeding $2M_e$, $5M_e$, $10M_e$, $20M_e$, $50M_e$, $100M_e$, or $200M_e$ for a given polymer.

In certain embodiments, degree of acetylation in cellulose acetate affects properties of cellulose acetate membranes. For example, a large percentage of acetate substitution (as a fraction of total available sites) may lead to greater gas permeabilities with slightly reduced $CO_2/CH_4$ gas selectivities. In certain embodiments, low extents of acetylation leads to significant degrees of chain packing and crystallinity, which reduce permeation of certain gases. In certain embodiments, cellulose acetate used in membranes or methods of their production is at between 10 wt. % and 80 wt. % acetyl. For example, cellulose acetate may be between 20 and 70 wt. %, 30 and 50 wt. %, 40 and 70 wt. %, or 10 and 50 wt. % acetyl.

Silane Crosslinks

The present application includes crosslinked polymer membranes and methods of grafting and crosslinking a crosslinking reagent to produce crosslinked polymer membranes. In certain embodiments, a crosslinking reagent acts as an electrophile when reacting with the pendant nucleophile of a polymer chain. In certain embodiments, crosslinking reagents grafted onto different polymer chains participate in an acid-catalyzed hydrolysis crosslinking reaction with each other during crosslinking. For example, silanes are used as crosslinking reagents. In certain embodiments, crosslinking reagents are alkoxysilanes. In certain embodiments, crosslinking reagents are silanols. In certain embodiments, a crosslinking reagent has two reactive sites, for example, three reactive sites or four reactive sites. In certain embodiments, crosslinking reagents have methoxy or ethoxy reactive groups, for example, as in vinyl methyl(dimethoxy) silane or vinyl methyl(diethoxy)silane, respectively. Suitable crosslinking reagents include, but are not limited to, vinyl trimethoxysilane, vinyl triethoxysilane, vinyl methyl (diethoxy)silane, vinyl methyl(dimethoxy)silane, vinyl triacetoxysilane, oligomeric vinyl methoxysilane, silanediol, dimethylsilanediol, diphenylsilanediol, and mixtures thereof. In certain embodiments, the crosslinking reagent is trimethoxysilane.

In certain embodiments, a silane is used to crosslink a polymer comprising a pendant nucleophile such that a crosslink comprising the silane results, wherein the crosslink comprising the silane is a crosslink formed from the silane. For example, a crosslink formed from a silane may be or comprise one or more reaction products of the silane that form during crosslinking. For example, an end group of a silane may be removed from a silane as a crosslink forms such that the crosslink is essentially made up of reaction products of the silane that are bonded together. In such an exemplary reaction, the resulting crosslink is said to comprise the silane or, equivalently, be formed from the silane.

Acid Catalysts

The present application includes methods for producing crosslinked cellulose acetate membranes. The methods include grafting, crosslinking, or grafting and crosslinking polymer chains with silanes in the presence of acid catalysts in order to form silane-crosslinked membranes. In certain embodiments, condensation reactions that bond alkoxysilanes to polymer chains are facilitated by the presence of an acid catalyst (for example, a weak acid catalyst). In certain embodiments, weak acid catalysts catalyze hydrolysis reactions between alkoxysilanes grafted to separate polymer chains to form a crosslink between the chains. In certain embodiments, an acid catalyst is used with a lower elevated reaction temperature to simultaneously graft and crosslink a preformed polymer membrane. In certain embodiments, the lower reaction temperature is an elevated temperature less than the glass transition temperature of a polymer in a membrane. The use of lower reaction temperatures may affect other properties of a membrane, such as preserving the porosity of a porous support layer. In certain embodiments, an acid catalyst is used to graft a silane to a polymer chain at pendant nucleophile sites on the chain prior to subsequent crosslinking.

An acid catalyst in accordance with methods of the present application is an acid that acts as a catalyst in facilitating condensation reactions between pendant nucleophiles of a polymer chain and a silane used to chemically crosslink two or more polymer chains together. For example, a facilitated reaction may be a condensation reaction between vinyltrimethoxysilane and a pendant acetate group on a cellulose acetate chain that produces methanol as a byproduct. Other reactions catalyzed by a weak acid may produce, for example, water or an alcohol as a byproduct. Generally, an acid catalyst that catalyzes nucleophilic reactions with the silane crosslinker (independent of the membrane polymer) should be avoided. In certain embodiments, acid catalysts that act as nucleophiles after protonation are unsuitable for use because the conjugate base of the acid will react with the silane thus inhibiting crosslinking. Acid catalysts that may be used, in some embodiments, include, but are not limited to, $HBF_4$, HCl, HBr, and $H_2SO_4$. In certain embodiments, an acid catalyst is a weak acid catalyst. In certain embodiments, a weak acid catalyst is a carboxylic acid. In certain embodiments, a weak acid catalyst is acetic acid. In certain embodiments, a weak acid catalyst is selected based, in part, on the pendant nucleophile of the membrane polymer in order to mitigate structural changes to the membrane polymer resulting from certain side reactions, such as replacement of a pendant group on a polymer backbone by the catalyst. For example, substitution of an acetate pendant group on a cellulose acetate chain by an acetic acid catalyst yields a polymer chain with similar chemical structure as compared to the unsubstituted chain.

Solvents

In certain embodiments, methods of the present application include reactions that occur in the presence of a solvent. For example, certain solution-grafting reactions occur in the presence of a solvent. Generally, an organic solvent for the polymer used for the dense selective layer is suitable when a solvent is used in the methods of membrane production. For example a theta solvent or good solvent for the polymer may be used. For example, when the polymer is cellulose acetate, the solvent may be dimethyl sulfoxide (DMSO), dimethylacetamide (DMAc), n-methyl-2-pyrrolidone (NMP), sulfolane, or tetrahydrofuran (THF). In certain embodiments, the solvent used in a solution-grafting reaction is DMSO.

Methods of Crosslinked Membrane Production

Solution-Grafting with Subsequent Casting and Crosslinking Methods

Figure 1:
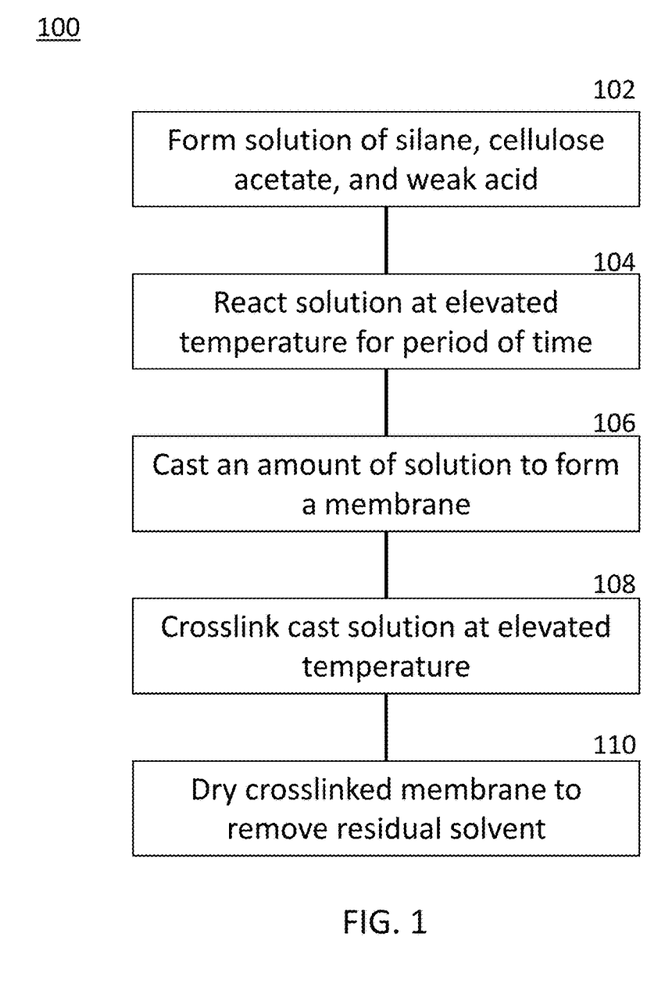
FIG. 1 is a block diagram of an exemplary method for grafting silanes to polymers and forming crosslinked polymer membranes from the grafted polymers, according to illustrative embodiments.

In certain embodiments, polymer membranes are produced using a sequential method to graft polymer chains, form a polymer membrane, and subsequently crosslink the membrane. FIG. 1 is a block diagram of exemplary sequential method 100.

In step 102, a solution is formed with a silane, a polymer with a pendant nucleophile, a weak acid catalyst, and a solvent in a reaction vessel. For example, a solution may include vinyltrimethoxysilane, cellulose acetate, acetic acid, and DMSO. In certain embodiments, the members of the solution are dried prior to step 102 to minimize premature crosslinking. In certain embodiments, the members of the solution are added sequentially by mixing the silane and the solvent, subsequently adding the weak acid catalyst, and subsequently adding the polymer under stirring. In certain embodiments, the reaction vessel is capped under inert gas flow once all members of the solution have been added.

In certain embodiments, a ratio of weak acid catalyst to solvent in the solution is between 1% and 30% (v:v). For example, the ratio may be between 1% and 20%, between 10% and 30%, between 10% and 20%, or between 15% and 20%, as (v:v) ratios. In certain embodiments, a ratio of the silane to the solvent is between 5% and 15% (v:v). For example, in certain embodiments, the ratio is 10% (v:v). In certain embodiments, a ratio of the polymer to the solvent is between 1% and 30% (w:v). For example, the ratio may be between 1% and 10%, between 1% and 20%, or between 5% and 10%, as w:v ratios. In certain embodiments, a ratio of the polymer to the solvent is 5% (w:v).

In step 104, the solution formed in step 102 is reacted at an elevated grafting temperature for a grafting period in order to graft the silane to the polymer. In certain embodiments, the elevated grafting temperature is at least 100° C. For example, the elevated grafting temperature may be between 100° C. and 150° C., between 120° C. and 150° C., or between 110° C. and 130° C. For example, the elevated grafting temperature may be 110° C., 120° C., or 130° C. In certain embodiments, the elevated grafting temperature is 130° C. In certain embodiments, the grafting period is at least 5 minutes. For example, the grafting period may be at least 90 minutes, at least 2 hours, at least 3 hours, between 1 hour and 3 hours, or between 1 hour and 5 hours.

In step 106, subsequent to cooling the solution to room temperature, an amount of the grafted solution is cast to form a membrane. The casting method used may be any method known in the art for casting polymer membranes. For example, the amount of solution may be drop cast, doctor bladed, or spin coated. The membrane may be cast by spinning. For example, cast by phase inversion spinning, dry/wet spinning, wet spinning, dry spinning, or electrospinning. The formed membrane may be a thin film, hollow fiber, or thin film composite. The membrane may be cast into or using a non-solvent. For example, use of a non-solvent induces an asymmetric morphology in certain embodiments. Cast membranes may have asymmetric morphology or a dense morphology. In certain embodiments, polymer membranes are cast such that each membrane comprises a porous support layer and a dense selective layer consisting essentially of a single polymer and the two layers form a continuous asymmetric structure. For example, using conventional hollow fiber casting techniques such as spinning and boring, an asymmetric hollow fiber having a continuous structure can be formed. Likewise, in certain embodiments, an asymmetric flat sheet membrane consisting essentially of a single polymer can be cast.

In step 108, the cast membrane is heated to an elevated crosslinking temperature for a crosslinking period in order to crosslink the polymer membrane. Crosslinks may be intermolecular or intramolecular such that a crosslinked membrane comprises intermolecular crosslinks or a combination of intermolecular and intramolecular crosslinks. In certain embodiments, the elevated crosslinking temperature is between 40° C. and 100° C. For example, the elevated crosslinking temperature may be between 40° C. and 80° C. or between 50° C. and 70° C. In certain embodiments, the crosslinking period is at least 10 minutes. For example the crosslinking period may be at least 30 minutes, at least 2 hours, at least 4 hours, at least 8 hours, at least 12 hours, between 10 minutes and 18 hours, between 10 minutes and 12 hours, between 4 hours and 12 hours, or between 2 hours and 8 hours. Without wishing to be bound by any theory, moderate elevated temperatures can be used because the polymer is already grafted with the silane.

In step 110, the crosslinked membrane is dried to remove residual solvent. The crosslinked membrane may be dried in vacuum. In certain embodiments, steps 108 and 110 occur simultaneously.

Post-Membrane-Formation Grafting and Crosslinking Methods

Figure 2:
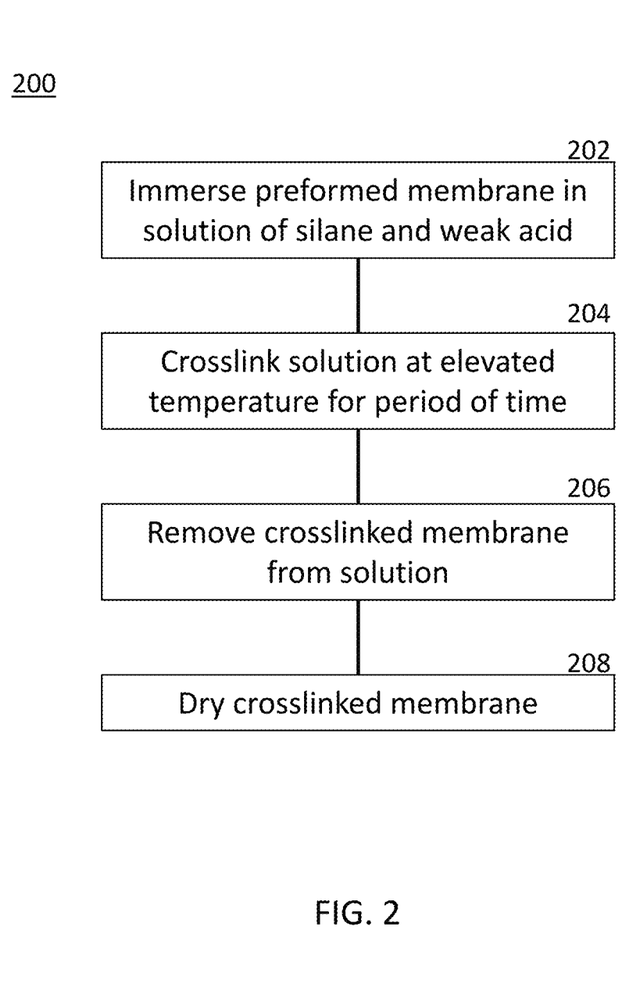
FIG. 2 is a block diagram of a method for crosslinking preformed polymer membranes, according to illustrative embodiments.

In certain embodiments, a crosslinked polymer membrane is produced by a method in which preformed polymer membranes are simultaneously grafted and crosslinked with a silane. A weak acid catalyst facilitates lower reaction temperatures during such methods. FIG. 2 is a block diagram of exemplary method 200 for crosslinking a preformed membrane.

In step 202, a preformed polymer membrane is immersed in a solution of a silane and a weak acid in a reaction vessel. The preformed membrane may be any membrane morphology known in the art. For example, the preformed membrane may be a flat sheet, hollow fiber, or thin film composite membrane. The preformed membrane may be asymmetric or not. In certain embodiments, a weight ratio of silane to weak acid in the solution is greater than 5:1. For example, 7:1, 9:1, or 15:1 or greater than 7:1, 9:1, or 15:1. In certain embodiments, a particular ratio of polymer to silane or polymer to weak acid catalyst is selected in order to ensure that membrane is fully immersed in the solution of silane and catalyst. For example, a molar ratio of silane to polymer may be greater than 100:1, greater than 40:1, greater than 20:1, or greater than 1:1. Selection of a certain reaction vessel size and geometry may facilitate using lower polymer to silane molar ratios such as 1:1 or lower. Additional solution components, such as a solvent, may be used to fill the volume of a reaction vessel in order for the polymer membrane to be fully immersed. The vessel may be sealed prior to step 204, such as with an o-ring and cap.

In step 204, the solution is crosslinked at an elevated crosslinking temperature less than a glass transition temperature of the polymers in the membrane for a crosslinking period. During step 204, grafting and crosslinking reactions occur that form crosslinks between pendant nucleophiles on polymer chains. Crosslinks may be intermolecular or intramolecular such that a crosslinked membrane comprises intermolecular crosslinks or a combination of intermolecular and intramolecular crosslinks. Processing at temperatures less than a glass transition temperature reduces or eliminates morphological transitions (exempli gratia densification of pores) that occur in a membrane due to polymer softening.

The reaction solution may be heated after the membrane is immersed or prior to immersion of the membrane. Heating may occur by immersing a reaction vessel in which crosslinking will occur in an oil bath.

In certain embodiments, the elevated crosslinking temperature is greater than 100° C. and less than a glass transition temperature. For example, the elevated crosslinking temperature may be less than a glass transition temperature and greater than 90° C., greater than 100° C., greater than 110° C., greater than 120° C., or greater than 130° C. For example, the elevated crosslinking temperature may be between 100° C. and 150° C., between 100° C. and 140° C., between 100° C. and 130° C., between 110° C. and 130° C., or between 100° C. and 120° C. of the bounding values. In some embodiments, the elevated crosslinking temperature is less than 100° C., but sufficiently elevated as to allow crosslinking to occur during the crosslinking period. For example, the elevated crosslinking temperature may be 90° C.

The crosslinking period is at least five minutes. Generally, shorter crosslinking times are used in conjunction with higher reaction temperatures. In certain embodiments, the crosslinking period is less than 15 hours. For example, the crosslinking period may be 10 hours, 5 hours, 3 hours, 1 hour, 2 hours, 30 minutes, between 5 and 30 minutes, between 5 minutes and 1 hour, between 1 hour and 3 hours, between 1 hour and 2 hours, between 1 hour and 15 hours, between 1 hour and 10 hours, or between 1 hour and 5 hours.

In step 206, the crosslinked membrane is removed from the solution. The reaction vessel may be cooled prior to removing the crosslinked membrane. For example, the reaction vessel may be removed from an oil bath and allowed to cool to room temperature either in ambient air or a controlled temperature fluid. Prior to step 208 and after step 206, the reacted membrane may be solvent exchanged in a non-solvent. For example, for cellulose acetate membranes, methanol or deionized water may be added after a reaction solution is poured out, allowed to sit for some period of time, and then be poured out. Multiple cycles of solvent exchange may take place, for example, by replacing the non-solvent several times after a pre-selected interval.

In step 208, the membrane is dried to remove residual reaction solution. Initially, an absorbent material, such as a paper towel, may be used to remove excess liquid, prior to subsequent drying. A vacuum oven is used to dry the crosslinked membrane at an elevated temperature. For example, the drying temperature may be between 50° C. and 150° C. (for example, 100-150° C.), for a period of up to 24 hours.

Figure 3:
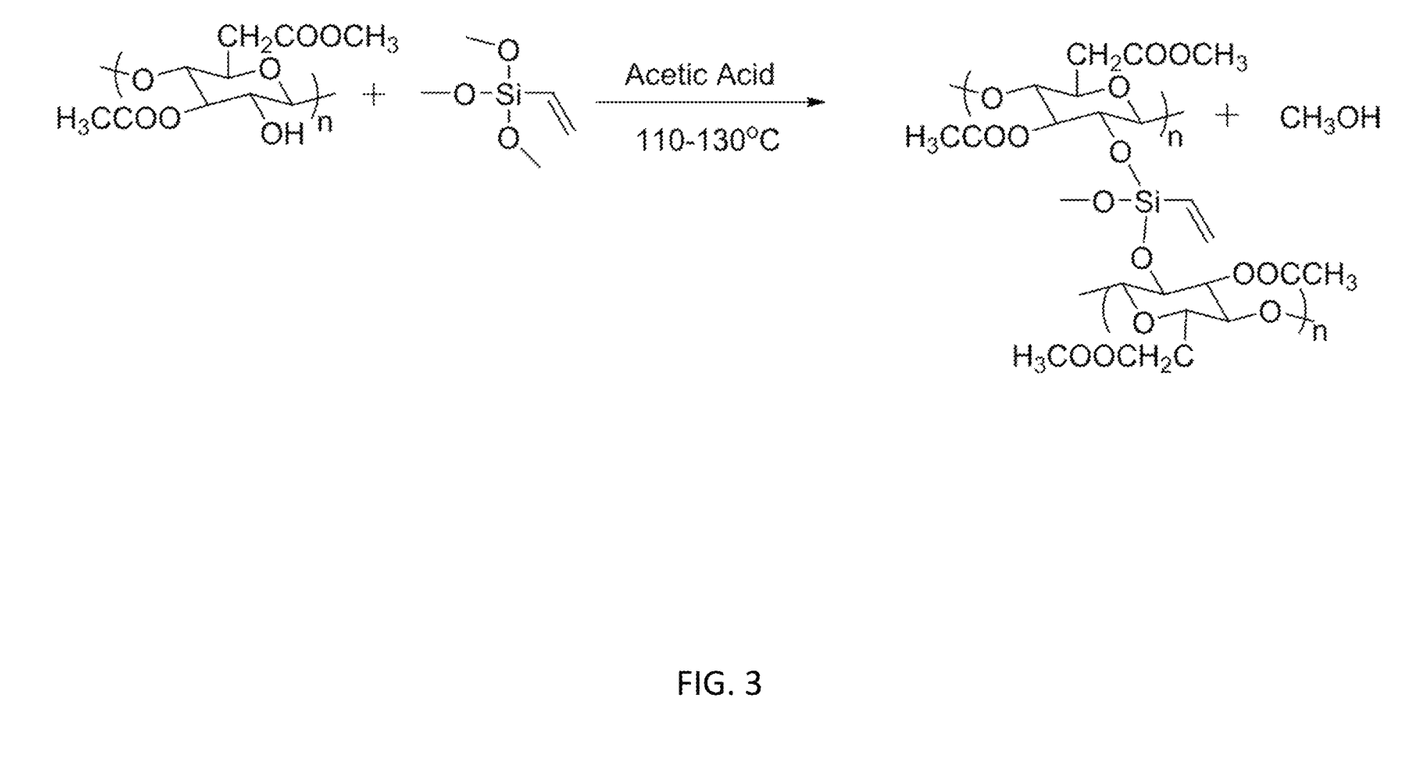
FIG. 3 shows a chemical reaction between cellulose acetate and vinyltrimethoxysilane that results in crosslinked cellulose acetate molecules, according to illustrative embodiments.

FIG. 3 shows an exemplary reaction that may occur during grafting and crosslinking in accordance with exemplary method 200. A cellulose acetate membrane is reacted with vinyltrimethoxysilane in the presence of acetic acid between 110 and 130° C., which results in silane crosslinks between cellulose acetate chains. The crosslink is said to comprise the silane (vinyltrimethoxysilane). The product of the reaction is crosslinked cellulose acetate where the crosslink formed from the silane (vinyltrimethoxysilane) is shown in FIG. 3 as a single silane moiety. However, crosslinks formed during such a reaction may be monomeric, oligomeric, or have a three dimensional structure.

Crosslinked Membranes

The present application also includes asymmetric silane-crosslinked polymer membranes with improved permeability and high selectivity for gas separation. In certain embodiments, the dense selective layer of a polymer membrane is a thin selective layer consisting essentially of a polymer with a pendant nucleophile and silane crosslinks. An asymmetric polymer membrane may, for example, have a flat sheet, hollow fiber, or composite thin film morphology. Multiple membranes (for example, between 100 and 1,000,000) may be bundled together into a single module for use in, for example, a gas pipeline. In certain embodiments, an advantage of membranes in accordance with the present application is that asymmetric morphologies formed during casting are preserved because temperatures during casting and processing remain below the glass transition temperature.

In certain embodiments, polymer membranes have one or more support layers. The one or more support layers are either the same material as the dense selective layer or a different material. The one or more support layers may be porous, non-porous, or both porous and non-porous (when multiple support layers are present). For example, a thin film composite membrane may have one porous support layer and one or more non-porous support layers that enhance membrane performance. A porous support layer may be formed during casting of the membrane, such as during a spinning process, for example. In certain embodiments, polymer membranes are cast such that the porous support layer and the dense selective layer form a continuous asymmetric structure such that the membrane has a thick porous surface and a thin dense selective surface. In certain embodiments, porous support layers, when part of a membrane, have porosities that, at a minimum, make diffusion through the dense selective layer of the membrane the rate limiting step in gas permeation through the membrane. A range of average pore sizes, pore size distributions, and porosities as a percentage of total volume allow rapid gas transport to the dense selective layer of a membrane.

In certain embodiments, the dense selective layer of a polymer membrane is between 80 nanometers (nm) and 100 micrometers ($\mu$m) thick. For example, a dense selective layer may be between 100 nm and 500 nm, between 100 nm and 250 nm, between 100 nm and 1 $\mu$m, between 500 nm and 1 $\mu$m, between 1 $\mu$m and 5 $\mu$m, between 1 $\mu$m and 10 $\mu$m, between 5 $\mu$m and 10 $\mu$m, between 1 $\mu$m and 50 $\mu$m, between 10 $\mu$m and 50 $\mu$m, between 10 $\mu$m and 30 $\mu$m, between 50 $\mu$m and 100 $\mu$m, or between 20 $\mu$m and 50 $\mu$m thick. In certain embodiments, a porous support layer of a polymer membrane is between 10 $\mu$m and 500 $\mu$m. For example, a porous support layer may be between 10 $\mu$m and 50 $\mu$m, between 10 $\mu$m and 100 $\mu$m, between 100 $\mu$m and 500 $\mu$m, or between 200 $\mu$m and 500 $\mu$m thick.

Crosslinked polymer membranes may have one or more of several silane crosslink structures. Silane crosslinks may be monomeric, dimeric, oligomeric, or have a three dimensional clustered arrangement. In certain embodiments, the crosslinks in a polymer membrane are on average oligomeric in length. For example, the crosslinks may be between 3 and 6 silane units in length on average as determined from gravimetric measurements. In certain embodiments, a pre-formed membrane modified with silane crosslinks in accordance with methods described in the present application has crosslinks between 1 and 2 silane units in length on average as determined from gravimetric measurements. In certain embodiments, crosslink structure is at least partially controlled by the reactivity of a silane used to crosslink. For example, the number of reactive groups on a silane or how strong of an electrophile the silane is may produce different crosslink structures or distribution of structures. In certain embodiments, crosslink structure is at least partially controlled by a ratio of silane to polymer during a grafting reaction, crosslinking reaction, or grafting and crosslinking reaction.

In certain embodiments, asymmetric crosslinked polymer membranes have high $CO_2$ permeability, high selectivity, and high plasticization resistance. In certain embodiments, $CO_2$ permeability is at least 20 Barrer when measured in pure gas flow at 25° C. and 100 psia. For example, $CO_2$ permeability may be at least 25 Barrer, at least 30 Barrer, at least 40 Barrer, at least 50 Barrer, between 20 Barrer and 60 Barrer, between 25 Barrer and 60 Barrer, between 30 Barrer and 60 Barrer, or between 40 Barrer and 60 Barrer when measured in pure gas flow at 25° C. and 100 psia. In certain embodiments, $CO_2/CH_4$ selectivity is at least 20 as determined from measurements in pure gas flow at 25° C. and 100 psia. For example, $CO_2/CH_4$ selectivity may be at least 22, at least 25, at least 27, at least 30, between 20 and 30, between 20 and 40, between 20 and 50, or between 30 and 50.

Plasticization resistance may be inferred from the relative $CO_2$ permeability of a membrane measured at two different pressures with constant temperature. In certain embodiments, $CO_2$ permeability measured with a pure gas flow at 500 psia and 25° C. is no more than 2.5 times $CO_2$ permeability measured with a pure gas flow at 25 psia and 25° C. For example, the permeability at 500 psia may be no more than 2 times, 1.5 times, or 1.2 times the permeability at 25 psia.

EXAMPLES

In order that the application may be more fully understood, the following examples are set forth. It should be understood that these examples are for illustrative purposes only and are not to be construed as limiting in any manner.

Example 1: Post-Membrane-Formation Grafting and Crosslinking

In Example 1, preformed membranes were grafted and crosslinked in accordance with "post-membrane-formation" methods of the present application.

All materials, solvents, and reagents were used as received unless otherwise noted. Cellulose acetate (50,000 $M_n$, 39.7 wt. % acetyl) was obtained from Sigma-Aldrich (St. Louis, MO). Prior to silane modification, cellulose acetate films were produced by preparing a 12 wt. % homogeneous solution in acetone, sonication to remove dissolved gases, and solution cast with a doctor blade in an acetone filled glovebag to reduce the rate of vitrification. The resulting film was cut into rectangular sheets and had an initial thickness between 20-50 μm. Films were dried for 16 hours at 110° C. under vacuum, and then transferred to a desiccator to cool to room temperature. Trimethoxyvinylsilane (97%, VTMS) was obtained from Sigma-Aldrich (St. Louis, MO). Acetic acetic (glacial) was obtained from Fisher Scientific (Waltham, MA). Before use, acetic acid was transferred to a round-bottom flask with copious amounts of copper (II) sulfate and stored under a nitrogen atmosphere. Dry methanol was obtained from Acros Organics (Waltham, MA) and stored under nitrogen.

A 100-mL wide mouth round-bottom flask was dried with a stir bar at 200° C. overnight before use. The glassware was cooled down under a nitrogen flow. A total volume of 75 mL of filtered acetic acid and vinyl trimethoxysilane (VTMS) were added to the round-bottom flask in a ratio of 10% (w:w). The cellulose acetate film was inserted between two Teflon sheets to prevent adhesion during the reaction and inserted into the reaction flask. The round-bottom flask was closed with a Teflon cap and O-ring seal. The reaction was heated to 110° C. and stirred at 400 rpm. Once the final temperature was achieved (110° C.), the reaction time of 3 hours was started. After the reaction duration, the round-bottom was lifted out of the oil bath and cooled at ambient conditions for one hour. The silane-acid reaction solution was poured out, and the round-bottom was refilled with methanol. After one hour, this solution disposal and refill was repeated once. The films were then removed, pat dried to clean off surface solvent, and sandwiched between cloth towels for an hour. After one hour, the towels were replaced and the films were dried overnight at 120° C. under vacuum overnight. The modified membranes were completely insoluble in hot N-methylpyrrolidone (at 100° C.), indicating that the polymer was covalently crosslinked.

Pure gas permeability coefficients were measured using a constant volume, variable pressure technique. Each of the polymer membranes was measured in triplicate. Methane was tested first because of the well documented plasticization potential of carbon dioxide. Permeability measurements were taken using a feed pressure of 100 psia at room temperature (23-25° C.). The downstream, or permeate pressure, was maintained at less than 5 Torr. Establishment of permeation steady-state was verified using the time-lag method, where 10 times the diffusion time-lag was taken as the effective steady-state. System pressure was measured using Baratron absolute pressure transducers (MKS Instruments, Billerica MA) and recorded using Labview Software. The permeability coefficient was calculated using the following equation:

$$P_i = n_i * l / \Delta f$$

where n is the molar flux, l is the membrane thickness and $\Delta f$ is the fugacity difference across the membrane. Ideal selectivity was calculated using the following equation:

$$\alpha_{ij} = P_i / P_j$$

Carbon dioxide and methane permeability in the crosslinked membrane was ~48 and 1.6 Barrer, respectively. Unmodified CA had a $CO_2$ and $CH_4$ permeability of ~4 and ~0.16 Barrer, respectively. Additionally, the crosslinked membranes showed only a 3 fold increase in $CO_2$ permeability at 500 psia relative to at 25 psia, while the uncrosslinked membranes displayed an 8 times increase in permeability. The results of this test is shown in Table 1.

TABLE 1

| Membrane | P($CO_2$) (Barrer) | P($CO_2$)/P($CH_4$) |
|---|---|---|
| Unmodified CA | 4.8 | 27-30 |
| Crosslinked CA | 48 | 25-30 |

Example 2: Solution-Grafting, Membrane Formation, and Subsequent Crosslinking

In Example 2, "solution-grafting and subsequent casting and crosslinking" methods were used to graft cellulose acetate in solutions, form membranes from the grafted cellulose acetate solutions, crosslink the membranes, and dry them to a final state. A range of conditions were tested in Example 2 and are summarized in Table 2.

In preparation for reactions, all reagents and glassware were thoroughly dried before use. The DMSO solvent was either distilled over calcium hydride and stored under molecular sieves and nitrogen, or purchased dry and stored under molecular sieves and nitrogen. Cellulose acetate was dried at temperatures >100° C. under vacuum prior to use.

Acetic acid was stored under copper sulfate and nitrogen. Silanes were stored under nitrogen. Glassware and stir bar were dried at 200° C. prior to use.

Reaction flasks were cooled under vacuum and nitrogen cycling. Dry DMSO and dry acetic acid (1-20% relative to DMSO (v:v)) were added under a nitrogen flow. Under a reduced nitrogen flow, dry silanes (10% (v:v) relative to dry DMSO) were added and stirred. Dry cellulose acetate (5% (w:v) relative to dry DMSO) was then added under aggressive stirring and a light nitrogen flow. The reaction vessels were capped under nitrogen flow, and stirred until all of the cellulose acetate had dissolved into the dry DMSO. The solutions were heated to an elevated temperature for a period of time as indicated in Table 2, and then cooled to room temperature. The reacted solutions were stable for at least 3 days as evidenced by lack of precipitate.

An amount of room temperature solution for each reaction was cast to form a membrane. The reaction solution was cast onto a glass surface and the surface was heated to between 50 and 70° C. The resulting crosslinked cellulose acetate films were further dried overnight at 150° C. under vacuum to remove residual DMSO. The resulting films were between 40 and 100 μm thick.

Pure gas permeability coefficients were measured using a constant volume, variable pressure technique. Methane was tested first because of the well documented plasticization potential of carbon dioxide. Permeability measurements were taken using a feed pressure of 100 psia at room temperature (23-25° C.). The downstream, or permeate pressure, was maintained at less than 5 Torr. Establishment of permeation steady-state was verified using the time-lag method, where 10 times the diffusion time-lag was taken as the effective steady-state. System pressure was measured using Baratron absolute pressure transducers (MKS Instruments, Billerica MA) and recorded using Labview Software. The permeability coefficient was calculated using the following equation:

$$P_i = n_i * l/\Delta f$$

where n is the molar flux, l is the membrane thickness and Δf is the fugacity difference across the membrane. Ideal selectivity was calculated using the following equation:

$$\alpha_{ij} = P_i/P_j$$

Figure 4:
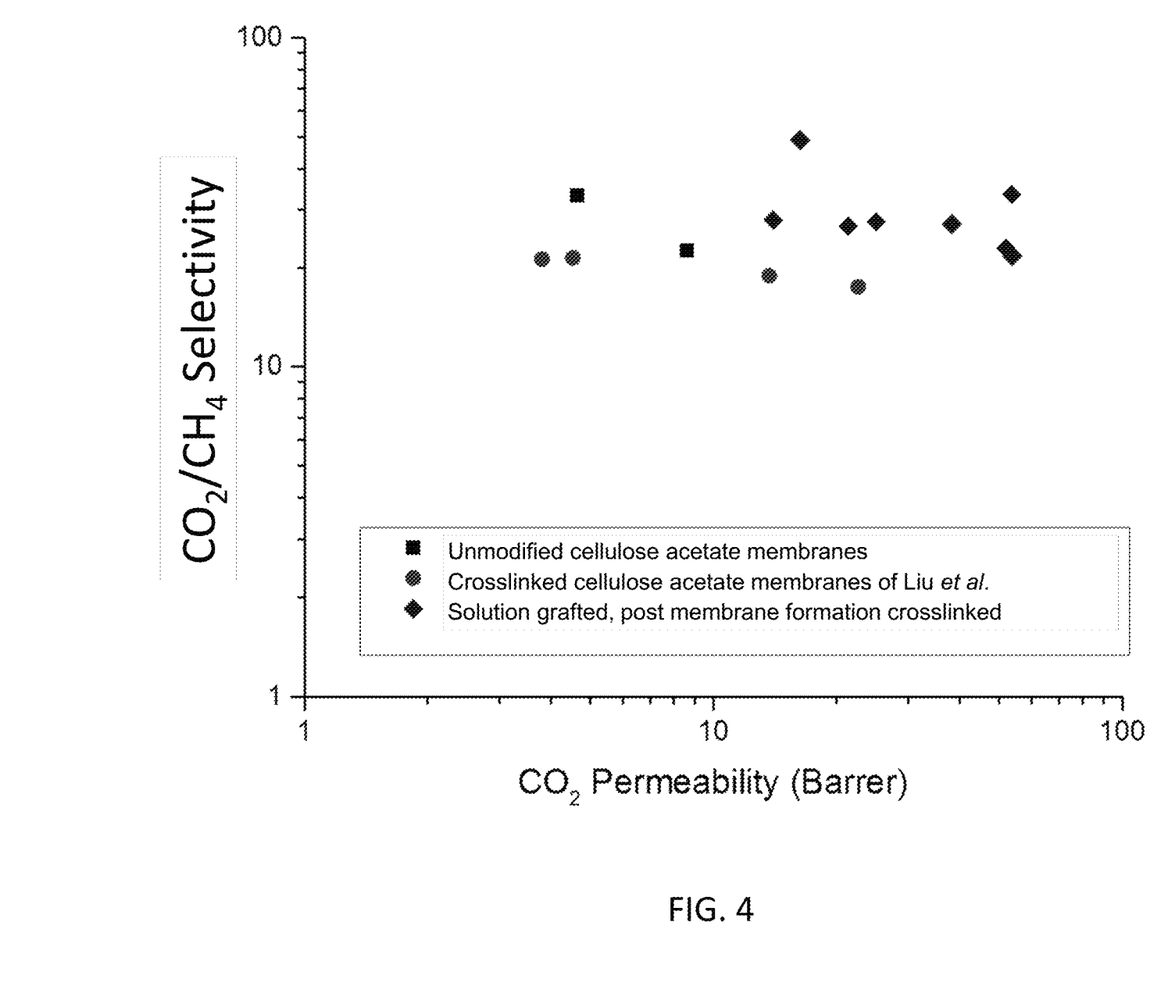
FIG. 4 is a scatter plot of cellulose acetate membranes with the $CO_2/CH_4$ selectivity plotted on the y-axis and the $CO_2$ permeability plotted on the x-axis, according to illustrative embodiments.

Measured values of permeability and selectivity are reported in Table 2. Additionally, the measured values of permeability and selectivity are plotted on a scatter plot in FIG. 4. Comparative values for unmodified cellulose acetate films and Liu et al. (U.S. Patent Publication No. 2010-0270234 A1) are plotted in FIG. 4 for reference. The membranes produced in accordance with methods of the present application have the highest permselectivity (combination of permeability and selectivity) of the three membrane types considered. For example, none of the membranes used for comparison had a $CO_2$ permeability exceeding 25 Barrer with a $CO_2/CH_4$ selectivity exceeding 25.

TABLE 2

| Sample | % Acid (relative to solvent (v:v)) | % Silane (relative to solvent (v:v)) | Temperature (° C.) | Time (hours) | $CO_2$ Permeability (Barrer) | $CO_2/CH_4$ Selectivity |
|---|---|---|---|---|---|---|
| Sample 1 | 1 | 10 | 130 | 2 | 21.4 | 26.9 |
| Sample 2 | 5 | 10 | 130 | 2 | 25 | 27.7 |

TABLE 2-continued

| Sample | % Acid (relative to solvent (v:v)) | % Silane (relative to solvent (v:v)) | Temperature (° C.) | Time (hours) | $CO_2$ Permeability (Barrer) | $CO_2/CH_4$ Selectivity |
|---|---|---|---|---|---|---|
| Sample 3 | 5 | 10 | 150 | 2 | 16.3 | 48.9 |
| Sample 4 | 5 | 10 | 170 | 2 | 14 | 28 |
| Sample 5 | 10 | 10 | 130 | 2 | 53.9 | 21.7 |
| Sample 6 | 15 | 10 | 130 | 2 | 38.3 | 27.2 |
| Sample 7 | 20 | 10 | 130 | 2 | 53.6 | 33.5 |
| Sample 8 | 20 | 10 | 130 | 2 | 38.3 | 27.2 |

Example 3: Feed Pressure Dependence of $CO_2$ Permeability

In Example 3, unmodified cellulose acetate membranes and cellulose acetate membranes crosslinked in accordance with methods of the present application were tested for feed pressure dependence.

Pure gas permeability coefficients were measured using a constant volume, variable pressure technique. Methane was tested first because of the well documented plasticization potential of carbon dioxide. Permeability measurements were taken at feed pressures of 25, 50, 75, 100, 150, 200, 250, 300, 400, and 500 psia at room temperature (23-25° C.). The downstream, or permeate pressure, was maintained at less than 5 Torr. Establishment of permeation steady-state was verified using the time-lag method, where 10 times the diffusion time-lag was taken as the effective steady-state. System pressure was measured using Baratron absolute pressure transducers (MKS Instruments, Billerica MA) and recorded using Labview Software. The permeability coefficient was calculated using the following equation:

$$P_i = n_i * l/\Delta f$$

where n is the molar flux, l is the membrane thickness and Δf is the fugacity difference across the membrane.

Figure 5:
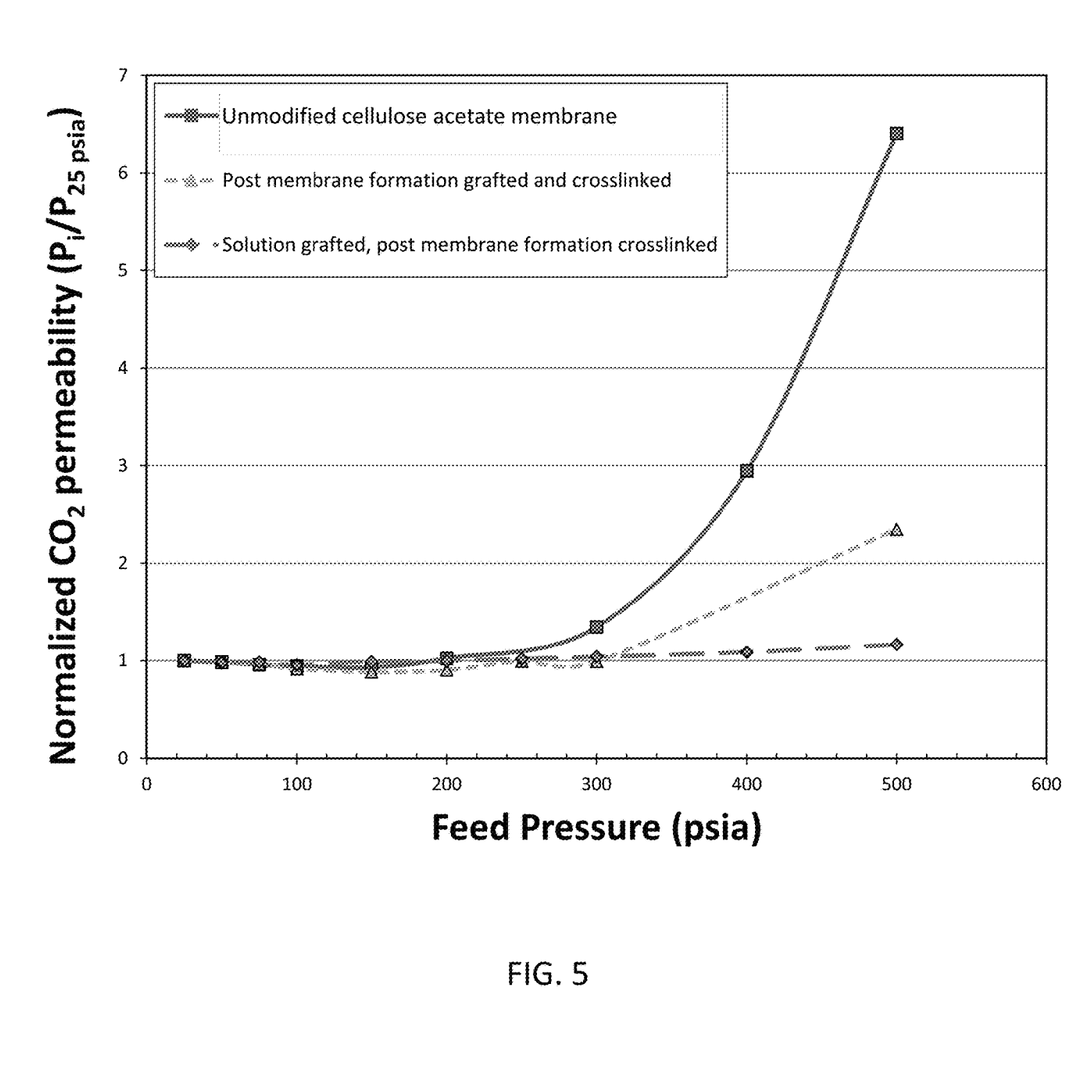
FIG. 5 is a plot of normalized $CO_2$ permeability as a function of feed pressure for crosslinked cellulose acetate membranes and a neat cellulose acetate membrane, according to illustrative embodiments.

FIG. 5 shows the measured values of pure gas permeability for $CO_2$ permeability at a given feed pressure normalized to the measured value of $CO_2$ permeability at 25 psia for unmodified cellulose acetate membranes, cellulose acetate membranes that underwent post-membrane-formation grafting and crosslinking, and membranes formed from cellulose acetate grafted in solution and subsequently crosslinked. The "post membrane formation grafting and crosslinking" data presented in FIG. 5 were measured from a sample produced by reacting a preformed membrane in a solution of 10% (w:w) acetic acid to vinyltrimethoxyilane at 120° C. for 3 hours. The "solution grafted, post membrane formation crosslinked" data presented in FIG. 5 were measured from a sample produced in accordance with the conditions listed for Sample 7 in Table 2. While normalized values of $CO_2$ permeability remain at about 1 for feed pressures less than 200 psia, performance between the different membrane types diverged for feed pressures greater than 200 psia.

Membranes produced in accordance with methods of the present application had lower normalized $CO_2$ permeability at high feed pressures. Unmodified cellulose acetate membranes had a normalized $CO_2$ permeability of ~6.5 at a feed pressure of 500 psia. Cellulose acetate membranes grafted and crosslinked after membrane formation occurred had a normalized $CO_2$ permeability of ~2.4 at a feed pressure of 500 psia. Cellulose acetate membranes formed from cellulose acetate grafted in solution and subsequently crosslinked had a $CO_2$ permeability of ~1.2 at a feed pressure of 500 psia. Without wishing to be bound by any theory, the reduction in the increase in normalized $CO_2$ permeability at high feed pressures for cellulose acetate membranes modified in accordance with the methods of the present application indicates that such membranes have greater plasticization resistance and, thus, would have longer operational lifespans.

Figure 6:
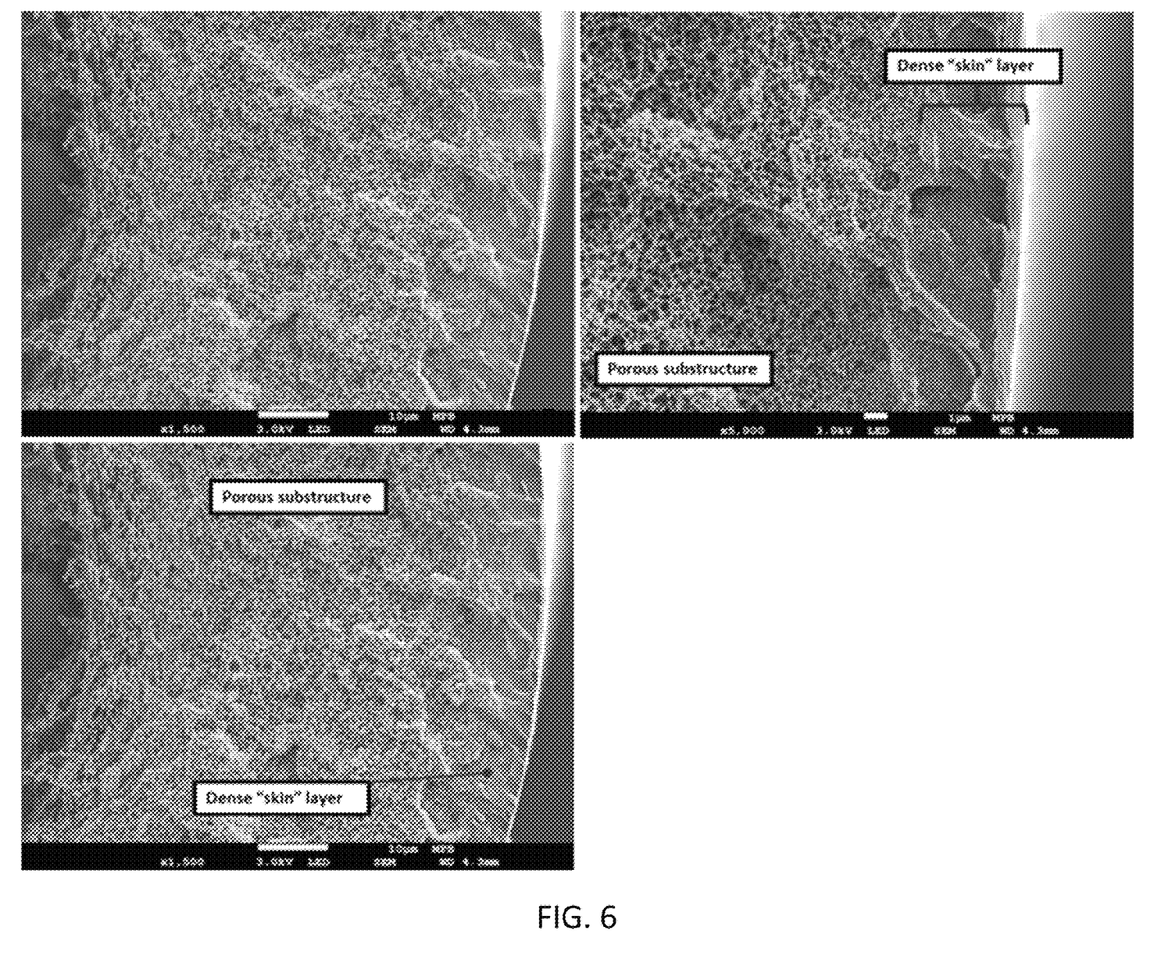
FIG. 6 is three scanning electron micrographs of an uncrosslinked cellulose acetate hollow fiber membrane.
Figure 7:
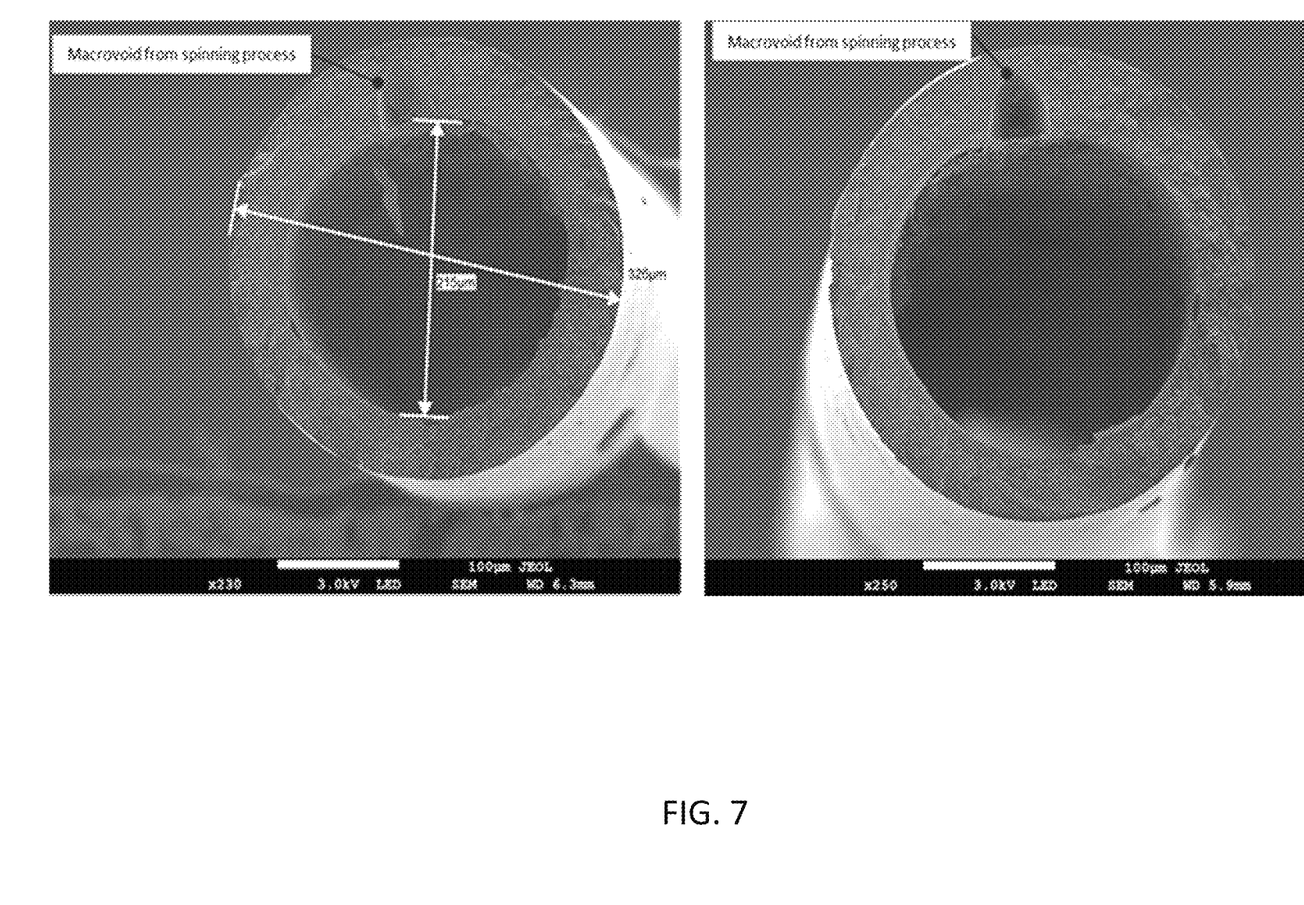
FIG. 7 is two scanning electron micrographs of a cellulose acetate hollow fiber membrane after subjecting to an acid catalyzed grafting and crosslinking reaction for 5 minutes, according to an illustrative embodiment.
Figure 8:
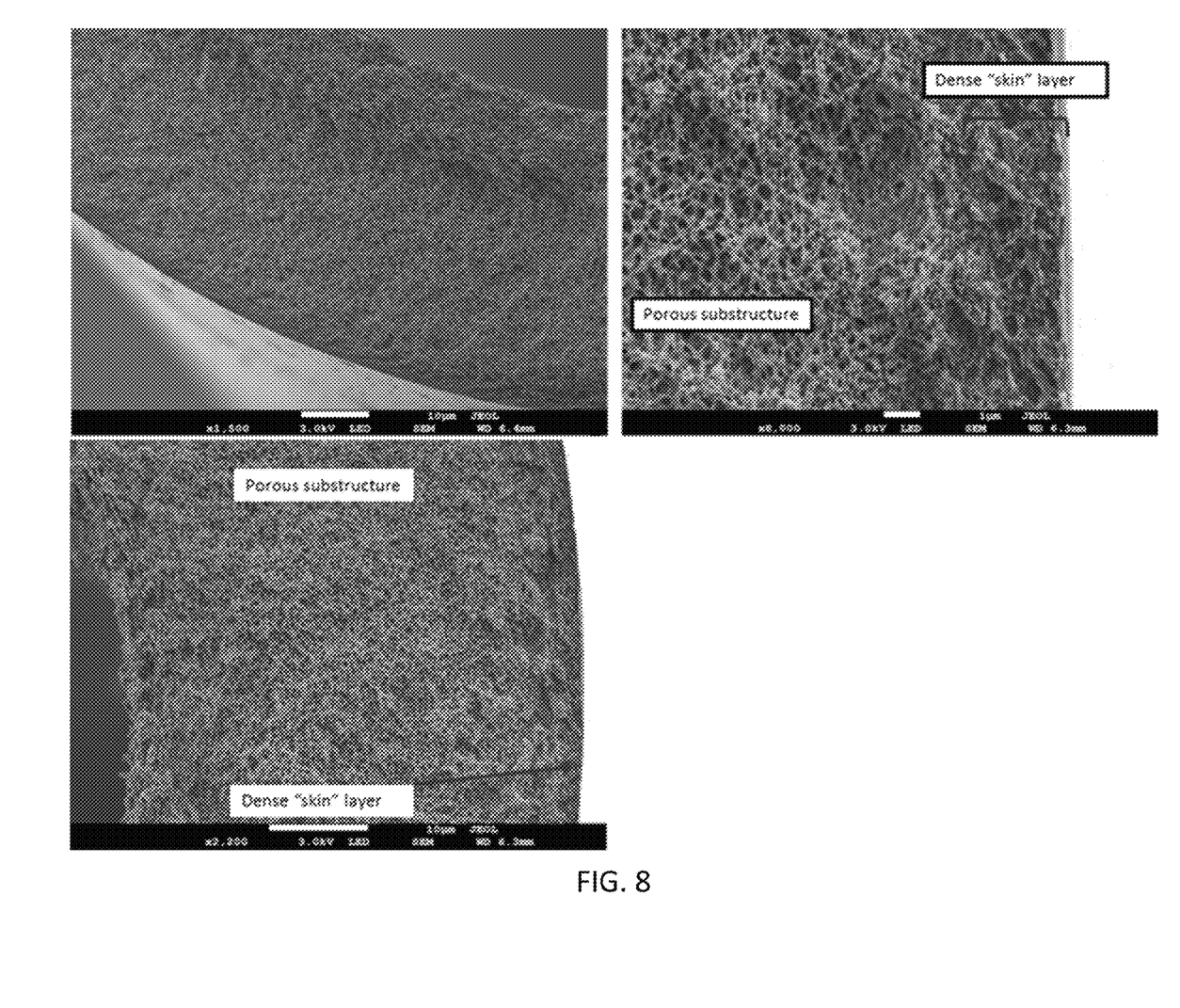
FIG. 8 is three scanning electron micrographs of a cellulose acetate hollow fiber membrane after subjecting to an acid catalyzed grafting and crosslinking reaction for 30 minutes, according to an illustrative embodiment.

Example 4: Persistence of Asymmetric Morphology During Grafting and Crosslinking In the Example, asymmetric crosslinked hollow fiber membranes with continuous structures were produced in accordance with methods of the present application and morphology was observed by scanning electron microscopy (SEM). FIGS. 6-8 show asymmetric hollow fiber membranes at various stages of exposure to a post-membrane-formation grafting and crosslinking reaction. FIG. 6 shows three SEM micrographs of a hollow fiber membrane that has not undergone a grafting and crosslinking reaction. FIG. 7 shows two SEM micrographs of a grafted and crosslinked hollow fiber membrane that has been exposed to a solution of 10% (w:w) acetic acid to vinyltrimethoxysilane at 120° C. for 5 minutes in order to graft and crosslink the membrane. A macrovoid formed during the spinning process that created the fiber is indicated on the micrographs as are the interior and exterior dimensions of the cross section of the fiber. No large scale degradation of the morphology is observed. FIG. 8 shows three SEM micrographs of a grafted and crosslinked hollow fiber membrane that has been exposed to a solution of 10% (w:w) acetic acid to vinyltrimethoxysilane at 120° C. for 30 minutes.

As shown in FIGS. 6-8, the porous layer and dense selective layer (referred to in the figures as "dense 'skin' layer") of the membrane are preserved after 30 minutes of reaction as compared to the unreacted membrane. Without wishing to be bound by any theory, the use of temperatures that do not exceed the glass transition temperature of cellulose acetate in processing the membranes inhibits pore densification. Preservation of pore morphology in the porous support layer of an asymmetric membrane throughout processing may improve overall performance of the membrane.

OTHER EMBODIMENTS

Certain embodiments of the present application were described above. It is, however, expressly noted that the present application is not limited to those embodiments, but rather the intention is that additions and modifications to what was expressly described in the present application are also included within the scope of the application. Moreover, it is to be understood that the features of the various embodiments described in the present application were not mutually exclusive and can exist in various combinations and permutations, even if such combinations or permutations were not made express, without departing from the spirit and scope of the application. Having described certain implementations of methods of producing crosslinked cellulose acetate membranes and asymmetric cellulose acetate membranes with high permeability and selectivity, it will now become apparent to one of skill in the art that other implementations incorporating the concepts of the application may be used. Therefore, the application should not be limited to certain implementations, but rather should be limited only by the spirit and scope of the following claims.

What is claimed is:

1. An asymmetric crosslinked polymer membrane, comprising:
   a porous support layer; and
   a dense selective layer having a thickness between 80 nanometers and 100 micrometers,
   wherein the dense selective layer comprises a polymer comprising a pendant nucleophile and a plurality of crosslinks comprising silanes formed from reaction with a weak acid catalyst, and
   wherein a $CO_2$ permeability through the membrane is at least 25 Barrer when measured in pure gas flow at 25° C. and 100 psia.

2. The asymmetric crosslinked polymer membrane of claim 1, wherein the membrane comprises a polymer comprising a member selected from the group consisting of a polyimide, a polysulfone, a polyamide, a polybenzoxazole, a polybenzimidazole, a polyphenyl ether, a polyketone, a polynorbornene, and an ester of cellulose.

3. The asymmetric crosslinked polymer membrane of claim 1, wherein the membrane comprises cellulose acetate.

4. The asymmetric crosslinked polymer membrane of claim 1, wherein the membrane comprises crosslinks formed from vinyltrimethoxysilane.

5. The asymmetric crosslinked polymer membrane of claim 1, wherein a $CO_2/CH_4$ selectivity across the membrane is at least 20 as determined from measurements in pure gas flow at 25° C. and 100 psia.

6. The asymmetric crosslinked polymer membrane of claim 1, wherein $CO_2$ permeability measured in pure gas flow at 25° C. and 500 psia is no more than 2.5 times $CO_2$ permeability measured in pure gas flow at 25° C. and 25 psia.

7. The asymmetric crosslinked polymer membrane of claim 1, wherein at least a portion of the plurality of crosslinks are oligomeric.

8. The asymmetric crosslinked polymer membrane of claim 1, wherein the porous support layer and the dense selective layer form a continuous asymmetric structure.

9. The asymmetric crosslinked polymer membrane of claim 1, wherein the asymmetric crosslinked membrane is a hollow fiber or thin film.

10. The asymmetric crosslinked polymer membrane of claim 1, wherein the asymmetric crosslinked membrane is a thin film composite membrane.

11. The asymmetric crosslinked polymer membrane of claim 1, wherein the weak acid catalyst is a carboxylic acid.

* * * * *